R. SUDIAH.
ELECTRIC HEATING SYSTEM.
APPLICATION FILED AUG. 2, 1917. RENEWED JAN. 7, 1922.
1,432,133.  Patented Oct. 17, 1922.
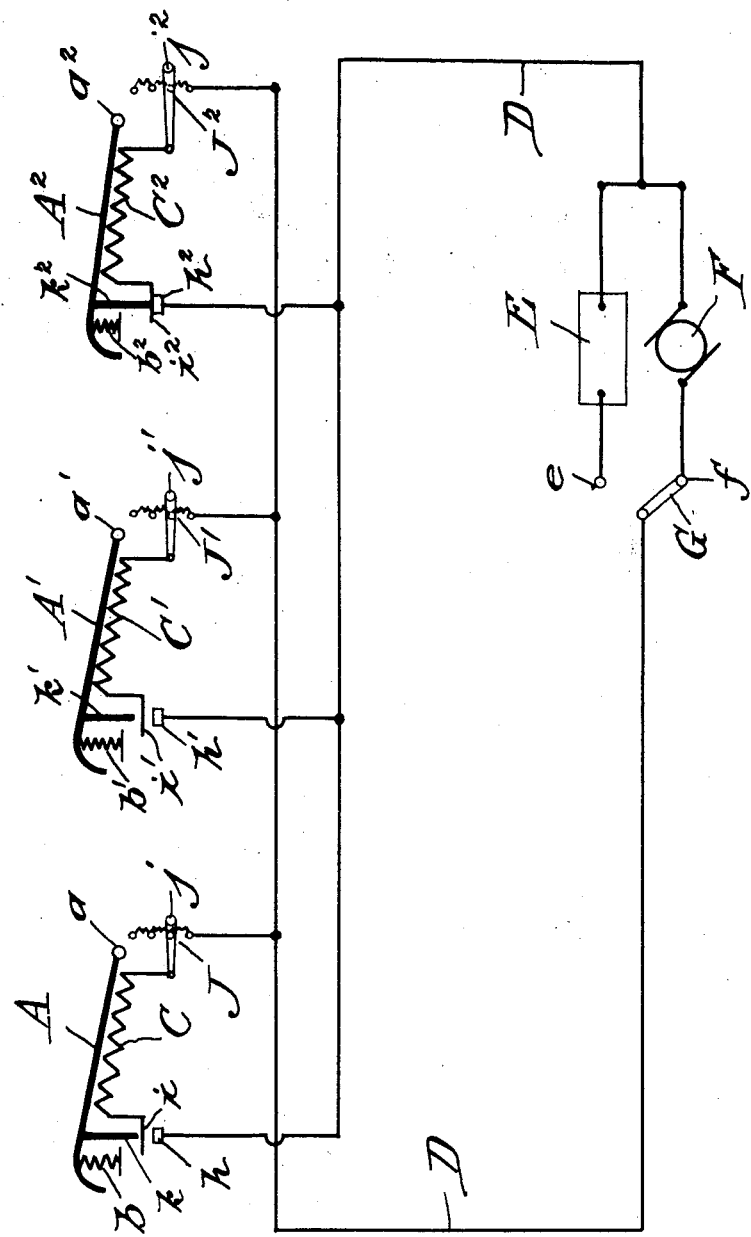
Rachel Sudiah, Inventor
By her Attorney
Jas. H. Griffin Patented Oct. 17, 1922.

UNITED STATES PATENT OFFICE.

RACHEL SUDIAH, OF NEW YORK, N. Y.

ELECTRIC HEATING SYSTEM.

Application filed August 2, 1917, Serial No. 184,056. Renewed January 7, 1922. Serial No. 527,799.

*To all whom it may concern:*

Be it known that I, RACHEL SUDIAH, a citizen of the United States, residing in the city of New York, borough of Bronx, county of Bronx, and State of New York, have invented a certain new and useful Electric Heating System, of which the following is a specification.

This invention is an electric heating system and is adapted, more particularly, for the heating of street car and automobile seats, the object of the invention being to provide electrical means whereby the seats may be heated individually and automatically while persons are sitting thereon, the current being automatically switched off when the occupant leaves the seat. A further object of the invention is to provide a system of the character described wherein the heat to any particular seat may be readily regulated to produce the desired temperature.

In the preferred form of the invention, a main energizing circuit is provided which may be supplied from any suitable source of electrical energy, such as a storage battery or dynamo, and included in this main, and connected in multiple therewith, are a plurality of electric heaters, one of which is positioned beneath each seat. Each seat is provided with a movable part adapted, when the weight of a person is imposed thereon, to complete the circuit through the heater associated therewith, and also associated with the circuit, and adjacent each seat, is variable resistance means whereby the amount of current energizing the heater may be varied to regulate the heat generated. With this construction, a person, in sitting upon a seat, automatically turns on the current to the heater associated therewith, and may, by operating the variable resistance means, control the temperature to which the seat may be raised. However, upon leaving the seat, the latter automatically breaks the circuit to its heater and the heating operation is discontinued. In this manner, it is not necessary to heat an entire street car in order that a person occupying one seat thereof may be kept warm in cold weather, but the heat supplied each person is controlled directly by him, and, when he is no longer present, the heating operation is automatically discontinued.

Features of the invention, other than those specified, as well as the advantages thereof, will be apparent from the hereinafter detailed description taken in conjunction with the accompanying drawing.

In the accompanying drawing I have illustrated, in a diagrammatic manner, the preferred system for carrying out the present invention in street car heating, but it will be understood that the invention is not limited to the specific structure shown or to the environment in which it is illustrated, the showing herein made being for illustrative purposes, only, and not defining the limits of the invention.

Referring to the drawing, A, A′ and A² designate three seats, such as may be positioned in a street car. These seats may be of any desired form and may be upholstered in any suitable manner. Each seat is pivoted at its rear edge, as at $a$, $a'$ and $a^2$, and is normally maintained in slightly elevated position by a spring $b$, $b'$ and $b^2$. In the drawing, the seats A and A′ are shown in their normally elevated positions, while seat A² is shown as depressed, with spring $b^2$ under tension. The position of seats A and A′ is that which the seats assume when no passenger is occupying the same, while the depressed position in which seat A² is shown is that to which it is forced when a passenger is sitting thereon.

Positioned beneath the seats are electric heating coils C, C′ and C², which are electrically connected, in multiple, with the main D, fed either from a storage battery E or a dynamo F. The storage battery and dynamo are in branches of the main D, and either may be thrown into circuit through the manipulation of a switch G adapted to cooperate with contacts $e$ or $f$, in accordance with the source of energy desired.

In one of the branches which lead to each heating coil is a switch composed of a fixed contact, $h$, $h'$, $h^2$, and a spring contact, $i$, $i'$, $i^2$, the latter of which connects directly with the particular heating coil with which it is associated, and in the return branches from the heaters are included variable resistance means, here shown in the form of rheostats, J, J′, J². The rheostats embody movable arms $j$, $j'$, $j^2$, respectively, which may be moved over a series of contacts to vary the resistance and thus regulate the current passing through the respective heating coils when the switches associated therewith are closed.

From the foregoing description, the operation of the device will be manifest, it appearing that, when no passengers are in the car, all of the seats will partake of the position in which seats A and A' are shown. However, if a passenger enters the car and occupies a seat, said seat will be depressed against the tension of its spring $b^2$ and will partake of the position in which seat $A^2$ is shown. The seats are respectively provided with spring operating fingers $k$, $k'$, $k^2$, so that finger $k^2$ will, when seat $A^2$ is depressed, force the spring finger $i^2$ of the switch into engagement with contact $h^2$, thereby completing the circuit from the main through heating coil $c^2$, and energizing the same, with the result that seat $A^2$ will be heated. The variable resistance means $J^2$ may be positioned in any convenient place, either on the arm of the chair or at the side of the car, and the arm $j^2$ of said means may be readily manipulated by the passenger to cut out more or less resistance, depending upon the amount of heat desired.

As long as the switch arm G is in engagement with either of the contacts $e$ and $f$, the circuit D will be operative to energize the heating coils, but, should the weather be moderate and heating be unnecessary, switch G may be thrown into neutral position to leave circuit D open, whereby all of the heating coils will be rendered inoperative, and the closing of the switch embodying contacts $h^2$ and $i^2$ will effect no change in temperature.

It will be understood that, while the present invention has been specifically described as means for heating street cars, it may be readily applied to the heating of railway coaches, automobiles, or in other environments wherein its employment will be advantageous. The salient advantage of the present invention over prior art devices, particularly for heating vehicles, is that there is no waste of current, only such seats as are occupied being heated, and these only while occupied. Thus, the present invention is much more economical than prior systems wherein the entire interior of the vehicle was heated, in many cases solely for the benefit of a single passenger. In these prior systems, the heat was frequently not turned on unless there were enough people in the car to warrant it, in which event one or two passengers have been caused great discomfort until a sufficient number boarded the car to warrant the heating thereof.

The construction of the present invention is extremely simple, economical to install, and may be readily applied to practically all the well known forms of cars, without the necessity of effecting marked changes in their construction. Moreover, the heaters may be controlled from the motors or dynmos of the car, or from the storage batteries associated therewith, as may be deemed desirable, and the same is true when the invention is employed in automobile heating.

In the accompanying drawing and foregoing description, one form of the invention and certain details thereof have been set forth, but it will be understood that, in adapting the invention to the various environments to which it is susceptible, slight modifications may be made without departing from the spirit of the invention, which is to be understood to be as broadly novel as is commensurate with the appended claims.

It has heretofore been suggested to automatically operate valves and even electric switches by means of the application and release of the weight of a person, but, so far as I am aware electric switches thus operated have never gone into use, but, in any event, electric heating systems have never been automatically thrown into operation, or the individual units thereof, by the weight of a person, applied in a sitting or standing position, and thrown out of operation upon such weight being removed.

Having thus fully described the invention, what I claim as new, and desire to secure by Letters Patent, is:

1. In an electric system for heating cars and the like, the combination of a plurality of separately movable seats on which individuals may be seated, a separate electric heater associated with each seat, immediately adjacent the seat for the purpose of warming a person sitting thereon, a source of current supply with which the respective heaters may be connected singly or in multiple, means cooperating with each seat and its associated heater, whereby, when a person occupies one of said seats, the incidental movement of the seat automatically completes the circuit from the source of supply through the heater associated with said seat, means whereby the circuit is automatically broken when the person arises from the seat, and separate means associated with each of the separate heaters for varying the intensity of heat of each heater.

2. In a system of the character described, a plurality of movable stations on each of which is adapted to be positioned an individual, a separate electric heater for heating each of said stations, a source of current supply for the several heaters, means cooperating with each station whereby, when the station is unoccupied, the heater associated therewith is automatically rendered inoperative, but, when the station is occupied, current is automatically turned on to the heater associated therewith for the purpose of heating said station, and means associated with the heater of each station for varying the intensity of the heat produced thereby.

3. In a system of the character described, a plurality of movable platforms on each of which is adapted to be positioned an individual, a separate electric heater for heating each of said platforms, a source of current supply for the several heaters, means co-operating with each platform for rendering its heater inoperative when the platform is unoccupied, and for automatically causing the heater to function when the platform is occupied for the purpose of heating said platform and means for varying the intensity of the heat at the several platforms.

In testimony whereof I have signed my name to this specification.

RACHEL SUDIAH.